(12) United States Patent
McDougal (10) Patent No.: US 9,749,295 B2
(45) Date of Patent: Aug. 29, 2017

(54) SYSTEMS AND METHODS FOR INTERNET TRAFFIC ANALYSIS

(71) Applicant: Raytheon Company, Waltham, MA (US)

(72) Inventor: Monty D. McDougal, St. Paul, TX (US)

(73) Assignee: Raytheon Company, Waltham, MA (US)

( * ) Notice: Subject to any disclaimer, the term of this patent is extended or adjusted under 35 U.S.C. 154(b) by 151 days.

(21) Appl. No.: 14/688,069

(22) Filed: Apr. 16, 2015

(65) Prior Publication Data

US 2016/0308885 A1  Oct. 20, 2016

(51) Int. Cl.
*H04L 29/06* (2006.01)

(52) U.S. Cl.
CPC ........ *H04L 63/0281* (2013.01); *H04L 63/145* (2013.01); *H04L 63/1416* (2013.01)

(58) Field of Classification Search
CPC  H04L 63/1416; H04L 63/0281; H04L 63/145
See application file for complete search history.

(56) References Cited

U.S. PATENT DOCUMENTS

| | | | | |
|---|---|---|---|---|
| 8,893,294 B1* | 11/2014 | Steele, III | ......... | G06F 17/30902 715/234 |
| 2006/0190606 A1* | 8/2006 | Kohavi | .................. | G06F 21/51 709/226 |
| 2008/0235239 A1* | 9/2008 | Penton | .............. | G06F 17/30902 |
| 2010/0192223 A1* | 7/2010 | Ismael | .................. | G06F 21/566 726/22 |
| 2011/0197281 A1* | 8/2011 | Alme | .................... | G06F 21/552 726/24 |
| 2013/0173782 A1* | 7/2013 | Ragutski | ............... | H04L 63/123 709/224 |
| 2015/0007312 A1* | 1/2015 | Pidathala | .............. | H04L 63/145 726/22 |
| 2015/0039677 A1* | 2/2015 | Kahol | ................. | H04L 63/0281 709/203 |
| 2015/0096022 A1* | 4/2015 | Vincent | ................. | G06F 21/566 726/23 |
| 2016/0269422 A1* | 9/2016 | McDougal | ............ | H04L 63/145 |

\* cited by examiner

*Primary Examiner* — Joseph P Hirl
*Assistant Examiner* — J. Brant Murphy
(74) *Attorney, Agent, or Firm* — Schwegman Lundberg & Woessner, P.A.

(57) ABSTRACT

Generally discussed herein are systems, apparatuses, and methods for internet traffic analysis. In one or more embodiments, a system can include a web proxy server to receive, from a client, a request to download content from an internet, produce a request to the internet for the content, receive the content from the internet, and produce a malware analysis request in response to receiving the requested content and a malware server communicatively connected to the web proxy server, the malware server to receive the malware analysis request and the content from the web proxy server, and issue a response to the malware analysis request indicating whether to allow the content to be downloaded to the client.

17 Claims, 3 Drawing Sheets

SYSTEMS AND METHODS FOR INTERNET TRAFFIC ANALYSIS

TECHNICAL FIELD

Embodiments discussed herein generally relate to systems and methods for detecting and/or remediating effects of malware. More specifically, one or more embodiments discussed herein relate to detecting malware in an internet download.

BACKGROUND

Malware commonly enters an enterprise via a number of vectors. One such vector is email and another is the internet (sometimes referred to as the "web"). Malware analysis on email can be accomplished by pausing an email delivery system and performing the analysis while the email delivery system is paused. Signature, heuristic, hash, and/or behavioral analysis can be performed on the email (and any attachments to the email) to determine if the email includes malware. If malware is discovered in email, the email delivery system can quarantine the email (e.g., refuse delivery of the email). Internet users generally will not tolerate a system that pauses (for an appreciable amount of time) before permitting access to web content. Thus, pausing the internet access like pausing the email access in an email delivery system can irritate a user base and is generally considered an unviable solution.

One current solution to detecting malware in internet access includes comparing a Universal Resource Locator (URL) to a list of known bad URLs. If the URL is on the list, then access to the URL is blocked. If the URL is not on the list, the access is permitted. Such a system requires proactive management of the list of known bad URLs and updating the list to include newly discovered bad URLs and removing once bad URLs that become good.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Embodiments in this disclosure generally relate to a man-in-the-middle sort of malware protection using a malware server communicatively coupled between a proxy server and a malware analysis system. One or more embodiments may help in providing malware protection from content of an internet download, such as a file being downloaded via the internet. The malware server can accept files over the ICAP protocol and provide a signal to the proxy server that indicates whether to allow or prohibit access to internet content.

A malware server can determine or be alerted when content (e.g., specific content) is being downloaded via a web proxy. In one or more embodiments, the malware server can do a quick analysis of the content to be downloaded (e.g., by performing heuristic analysis, signature analysis, and/or a hash analysis on the content to be downloaded). The proxy server can provide an indication to the web proxy regarding whether the content is good or bad based on the analysis. The web proxy can allow or deny access based on the indication.

In one or more other embodiments, the malware server can always provide an indication that the content is to be allowed to be downloaded to the client. The malware server can receive a copy of the content to be downloaded and provide the content to a malware analysis system that can perform malware detection on the downloaded content. If the content is determined to be malware, steps can be taken to remediate any damage that may have been caused by the malware and/or the downloaded content can be eradicated from at least a portion of the network it was downloaded to.

Using the man-in-the-middle type approach to malware analysis can provide the ability to perform malware analysis with encrypted content or communications. One challenge with the man-in-the-middle type approach is that it may not be entirely transparent to the end user (without some pre-configuration). These techniques are well suited for web traffic in situations where the user's traffic passes through a gateway under administrator control. Using a malware server (e.g., a server implementing the Internet Content Adaptation Protocol (ICAP)) allows for looking at content traversing a web proxy where the malware server is configured for active man-in-the-middle of the Security Socket Layer (SSL) connections. This assumes that the systems under observation route through the malware server and that the malware server is configured to break the SSL connection (which can be how a proxy is configured doing content malware inspection). This solution is usually semi-transparent to the user as long as they have the malware server's private key in their web browser as a signing authority.

Responses back from the malware server to the web proxy server could always be "good", such as to hide the actual adjudication from the client side (but take action on the high-side), "good/bad", or "good/bad/wait". A bad indication blocks at least some malicious content before it gets to the client. A wait indication tells the proxy to pause before releasing a file to the client. Such indications can be provided without exposing the details of the logic making the decision (which could be classified).

Figure 1:
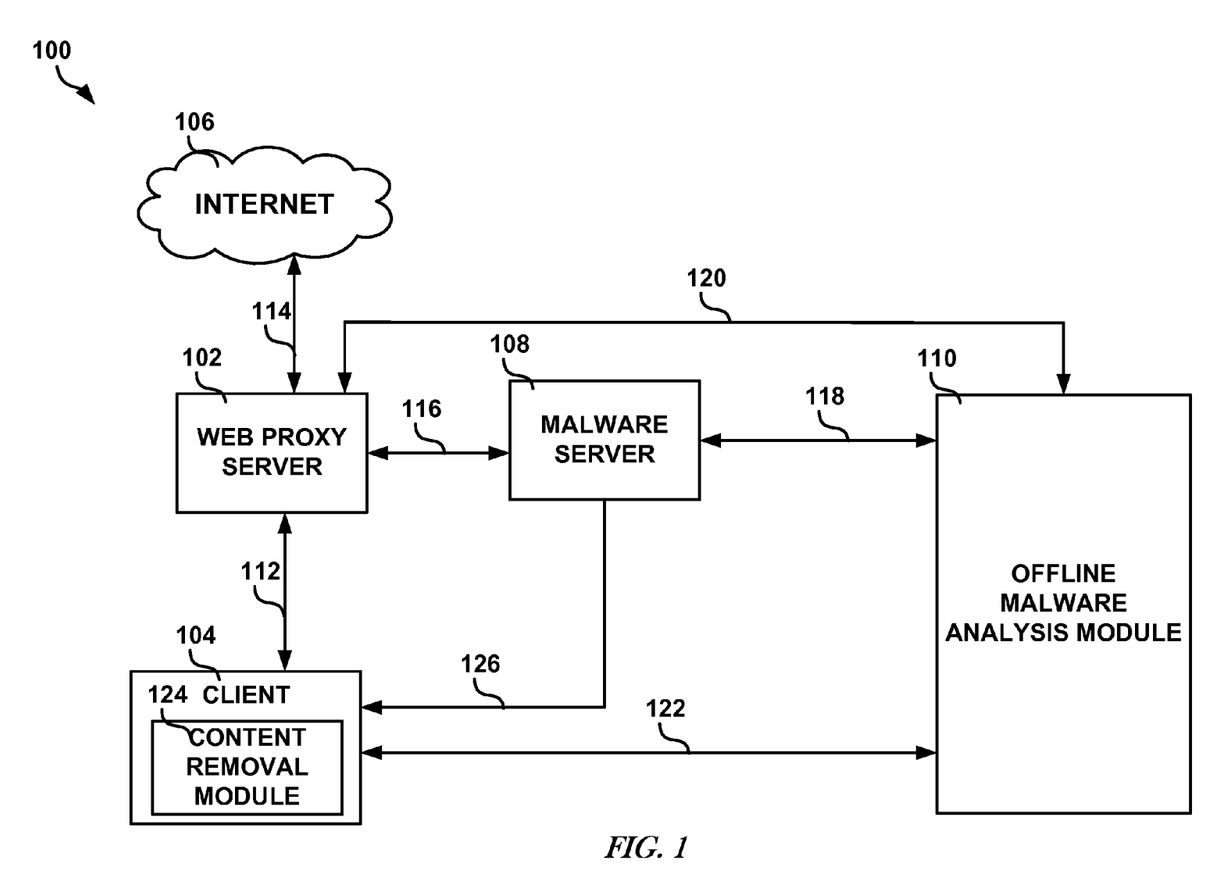
FIG. 1 illustrates, by way of example, a block diagram of an embodiment of a system for detecting malware in internet content.

FIG. 1 illustrates, by way of example, a block diagram of an embodiment of a system 100 for malware analysis of internet content. The system 100 as illustrated includes a web proxy server 102 communicatively coupled between a client 104 and an internet 106. The system 100 includes a malware server 108 communicatively coupled between the web proxy server 102 and an optional malware analysis module 110.

The web proxy server 102 acts as a middleman between the client 104 and the internet 106. The web proxy server 102 is configured to receive requests (e.g., in a Hypertext Transfer Protocol (HTTP) format) for web content (e.g., a file, connection, web page content, or other resource available from the web) from the client 104, such as through connection 112. The web proxy server 102 is configured to issue a request for the web content to the internet 106. The internet 106 generally responds by providing the requested content to the web proxy server 102 or providing some indication as to why the content is not provided (e.g., invalid URL does not exist, etc.).

The client 104 can include a web browser that connects to the web proxy server 102 to retrieve content from the internet 106. The client 104 can be one of many clients connected to the web proxy server 102 via a network connection (e.g., the connection 112).

The client 104 can include a content removal module 124. The content removal module 124 can search the client 104 for specific content (e.g., by name, contents, download date or time, time modified, author, or other identifier) and the content removal module 124 can remove the content from the client 104. The content removal module 124 can be communicatively connected to multiple clients or other network devices and can remove the specific content from all locations it has access to in response to receiving a request to remove the specific content. The content removal module 124 generally aids in removing content that was allowed by the malware server 108, but determined to be malware by the malware analysis module 110.

The internet 106 receives requests for content from the web proxy server 102, such as through a network connection (e.g., the connection 114). The internet 106 generally is a system of connected computer networks. The Transmission Control Protocol/Internet Protocol (TCP/IP) protocol is typically used to connect devices on the internet 106. The internet 106 as used herein refers to any network not controlled by the administrators of the network that includes the client 104.

In one or more embodiments, the web proxy server 102 is configured to issue a request to the malware server 108 in response to receiving content from the internet 106. The web proxy server 102 is configured to wait for a response from the malware server 108 regarding the request before forwarding the requested content to the client 104 or indicating to the client 104 that the content is prohibited.

The web proxy server 102 can issue the request to the malware server 108 for all content received from the internet 106 or for only a subset of the content received from the internet 106, such as only files or files that include certain characteristics. For example, the web proxy server 102 or the malware server 108 can compare an extension of a file to a list of extensions, and if the extension matches an extension in the list of extensions, the web proxy server 102 can issue the request to the malware server 108. Some common file extensions include, but are not limited to ".exe", ".pdf", ".doc", ".docx", ".ppt", ".pptx", ".txt", ".jpeg", ".img" ".wav", ".png" ".dmg" ".html", ".tar", ".gz" ".gfx" ".mus", ".mp3", ".mp4", ".java", ".vbs", ".c", ".C++", ".xl", ".xls", etc.

In one or more examples, the web proxy server 102 can compare metadata of the file to a list of one or more metadata conditions and issue a malware request for only those files that meet the metadata conditions. Metadata is data about the contents of a file. Metadata can include structural metadata (data describing the format, design, and specification of data structures or containers of the file) and descriptive metadata (data describing specific individual instances of the content of the file). Metadata can include, for example, identification of a program used to create the file, a purpose of the content, time and/or date the file was created or last modified, author of the file, a location where the file was created (e.g., an IP address of a computer used to create the file), a size of the file, among other metadata. For example, a file that includes more data than a specified size limit can be forwarded to the malware server 108 with a malware analysis request. The metadata conditions or extension names can be saved in a memory local or remote to the web proxy server 102.

The malware server 108 is communicatively connected between the web proxy server 102 and the malware analysis module 110. The malware server 108 receives malware requests from the web proxy server 102 and provides a response to the web proxy server 102 to indicate to the web proxy server 102 whether to forward requested content to be downloaded at the client 104, such as by using a connection 116. If the malware server 108 indicates that the content is not to be forwarded to the client 104 for downloading, the web proxy server 102 can provide an indication to the client 104 that conveys that the requested content is prohibited.

In one or more embodiments, the malware server 108 can be configured to always issue a response to the web proxy server 102 that indicates that the content is to be forwarded to the client 104 for downloading. The response issued by the malware server 108 can be issued without any malware analysis on the content and virtually no apparent delay in forwarding the content to the client 104. In such embodiments, the content can be saved for malware analysis without affecting the performance as viewed by a user of the client 104.

In one or more other embodiments, the malware server 108 can perform a quick malware inspection on the content before issuing a response to the malware analysis request. The malware analysis can include one or more of a signature analysis, a heuristic analysis, or a hash analysis, for example. In such embodiments, there is a lag (e.g., a small lag, such as can be less than a second or a few seconds) inserted in between the malware analysis request from the web proxy server 102 and the response to the request from the malware server 108.

A signature analysis includes determining if content includes a specific bit or byte pattern. For example, the bit sequence "1100110011001100" can be associated with malware. The malware server 108 can determine if the content includes that bit sequence, and if it is not detected, the malware server 108 can determine that the content does not include malware based on the signature analysis.

A heuristic analysis is a method of detecting a variant of known malware or a new type of malware. As malware mutates or is changed (e.g., to attack a different system type or to get through malware detection software) the code or signature of the malware changes. Families of malware, however, retain commonalities with other malware in the family. These commonalities can be detected by creating a single signature that encapsulates the similarities between the malware in the family with one or more non-contiguous code identifiers (e.g., wild card characters) where differences between members of the malware family occur. A malware detection scheme can thus detect if content is a member of the family regardless of differing code inserted in place of the wild card(s).

A fuzzy hash analysis includes determining a plurality of hash values (e.g., a checksum, and MD5 hash, an SHA1 hash, or other hash) on portions of the contents and/or metadata of the file and comparing the determined hash value(s) to hash values of a document known to be malware. If a specified number or percentage of the determined hash value(s) matches hash values of a file known to be malware, the file can be determined to include malware. Fuzzy hash analysis can include hashing content of a file in a sliding window or in blocks.

If the malware server 108 determines the content includes malware or is likely to include malware (e.g., based on one or more of the heuristic, signature, or hash analysis), the malware server 108 can provide an indication to the web proxy server 102 that the content is to be prohibited. The web proxy server 102 can then issue a response to the client 104 indicating that the requested content is prohibited. If the malware server 108 determines the content does not include malware based on the one or more malware analyses, the malware server 108 can issue a response to the web proxy server 102 that causes the web proxy server 102 to forward the requested content to the client 104.

In one or more embodiments, if the malware server 108 determines that the content is malware or is likely malware, and the requested content was downloaded to the client 104, the malware server 108 can indicate to the content removal module 124, such as through a connection 126, that the content is to be removed from the client 104 or any other location on the local network the content now resides or has affected. Similarly, if the content was determined to be malware by the malware analysis module 110, the malware analysis module 110 can indicate to the content removal module 124, such as through a connection 122, that the content is to be removed from the client 104 or any other location on the local network the content now resides or has affected.

In one or more embodiments, the content received at the malware server 108 can be forwarded to the malware analysis module 110 for (further) analysis, such as through connection 118. The malware analysis module 110 can perform one or more malware analysis techniques on content to determine if the content includes malware. The techniques can include one or more of a heuristic analysis, a signature analysis, a fuzzy hash analysis, and/or a behavioral analysis, among others.

A behavioral analysis includes executing commands of content, such as in an isolated (e.g., virtual) environment and monitoring the commands as they are performed. If the commands performed exhibit typical malware type behavior(s), the content can be considered malware. Behavioral analysis can take a significant amount of time (minutes or even hours) to perform. Thus, delaying a content request from the client 104 until behavioral analysis is complete can cause frustration among users.

The malware analysis module 110 and/or the malware server 108 can be configured to update a list of known malware characteristics in response to determining content includes (or is likely to include) malware. For example, if the malware server 108 determines that content includes or is likely to include malware, the malware server 108 can indicate to the web proxy server 102 that the URL corresponding to the content is prohibited and can add the content name and/or details regarding the content to a list of known bad content. Similarly, if the malware analysis module 110 determines that content includes or is likely to include malware, the malware analysis module 110 can indicate to the web proxy server 102, such as using a connection 120, that the URL corresponding to the content is prohibited and can add the content name and/or details regarding the content to a list of known bad content. If the content was allowed to be downloaded to the client 104, the malware analysis module 110 can provide an indication to the content removal module 124, such as through a connection 122, to cause the content removal module 124 to remove the content.

Figure 2:
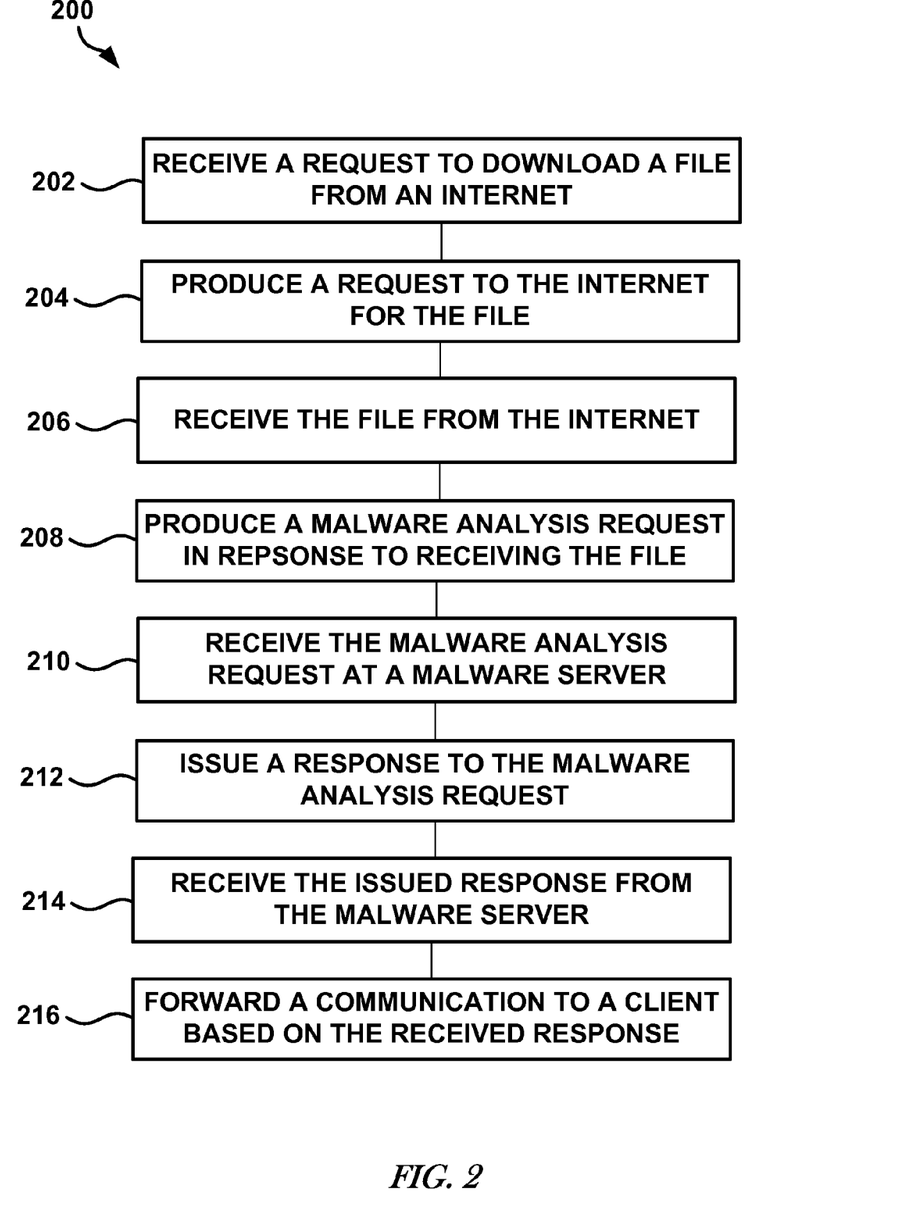
FIG. 2 illustrates, by way of example, a flow diagram of an embodiment of a method for internet traffic analysis.

FIG. 2 illustrates, by way of example, a flow diagram of an embodiment of a method 200 for internet traffic analysis. The method 200 as illustrated includes: receiving a request to download content from an internet, at operation 202; producing a request to the internet for the content, at operation 204; receiving the content from the internet, at operation 206; producing a malware analysis request in response to receiving the content, at operation 208; receiving the malware analysis request at a malware server, at operation 210; issuing a response to the malware analysis request, at operation 212; receiving the issued response from the malware server, at operation 214; and forwarding a communication to client based on the received response, at operation 216. Note that one or more of the operations may be omitted or in a different order than presented.

The operations at 202, 204, 206, 208, 214, and 216 can be performed at the web proxy server. The operations at 210 and 212 can be performed at the malware server. The malware analysis request, produced at operation 208, can include the received content and can be produced in response to receiving the content. The response issued at operation 212 can indicate whether to allow the content to be downloaded to the client or to prohibit the content from being downloaded to the client. The operation at 216 can include forwarding a communication including the content if the issued response indicates to allow the content to be downloaded. The operation at 216 can include forwarding a communication including an indication that the content is prohibited if the issued response indicates to prohibit downloading the content to the client.

The operation at 212 can include always issuing, at the malware server, a response that indicates the content is allowed to be downloaded at the client. The method 200 can further include prior to issuing the response to the malware analysis request at operation 212, performing, at the malware server, a heuristic, signature, and/or hash (e.g., fuzzy hash) analysis on the content. The response to the malware request, issued at operation 212, can indicate the web server is to forward the content to the client in response to determining the content does not include malware based on the analysis (e.g., heuristic, signature, and/or hash analysis). The response to the malware request, issued at operation 212, can indicate the web server is to forward a communication to the client that indicates the content is prohibited in response to determining the content includes malware based on the analysis.

The method 200 can further include receiving, at a malware analysis system, the content from the malware server, performing, at the malware analysis system, a behavioral, hash, heuristic, or signature analysis. The method 200 can further include issuing, from the malware analysis module, an indication to the malware server or the web proxy server indicating whether the content includes or is likely to include malware. The method 200 can include in response to determining the content includes malware, issuing, using the malware analysis module or the malware server, a notice to an application that causes the application to remove the content from the client and/or other locations on the local network.

Figure 3:
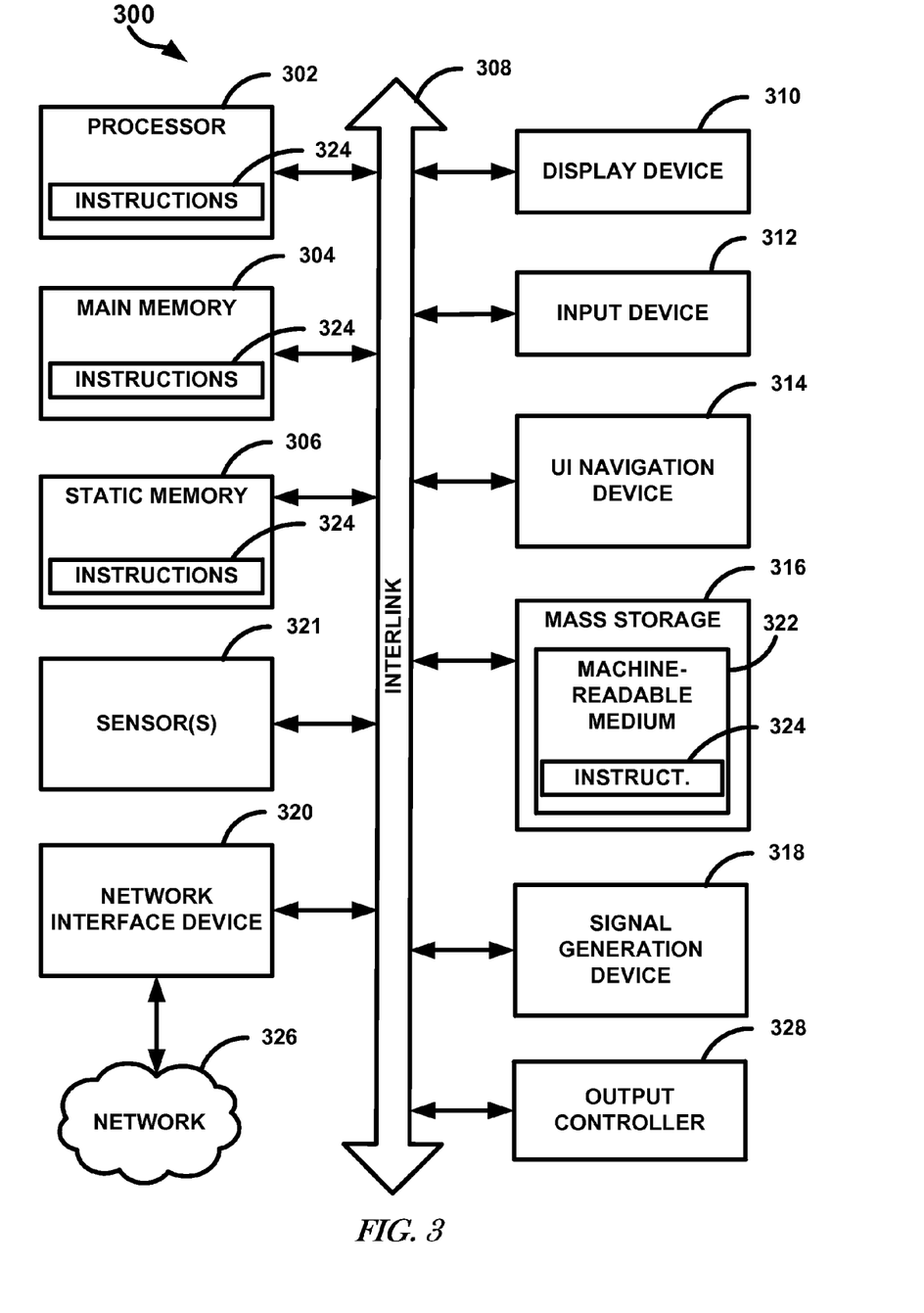
FIG. 3 illustrates, by way of example, a block diagram of an embodiment of a machine upon which any one or more of the processes (e.g., methodologies) discussed herein may be performed.

FIG. 3 illustrates, by way of example, a block diagram of an embodiment of a machine 300 upon which any one or more of the processes (e.g., methodologies) discussed herein may be performed. The servers (e.g., the web proxy server 102 and the malware server 108), the client 104, and the malware analysis module 110 can include one or more of the items of the machine 300. In alternative embodiments, the machine 300 can operate as a standalone device or can be connected (e.g., networked) to other machines. In a networked deployment, the machine 300 can operate in the capacity of a server machine, a client machine, or both in server-client network environments. In an example, the machine 300 can act as a peer machine in peer-to-peer (P2P) (or other distributed) network environment. The machine 300 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities (e.g., hardware) capable of performing specified operations when operating. A module includes hardware. In an example, the hardware can be specifically configured to carry out a specific operation (e.g., hardwired). In an example, the hardware can include configurable execution units (e.g., transistors, circuits, etc.) and a computer readable medium containing instructions, where the instructions configure the execution units to carry out a specific operation when in operation. The configuring can occur under the direction of the executions units or a loading mechanism. Accordingly, the execution units are communicatively coupled to the computer readable medium when the device is operating. In this example, the execution units can be a member of more than one module. For example, under operation, the execution units can be configured by a first set of instructions to implement a first module at one point in time and reconfigured by a second set of instructions to implement a second module.

Machine (e.g., computer system) 300 can include a hardware processor 302 (e.g., a central processing unit (CPU), a graphics processing unit (GPU), a hardware processor core, or any combination thereof), a main memory 304 and a static memory 306, some or all of which can communicate with each other via an interlink (e.g., bus) 308. The machine 300 can further include a display unit 310, an alphanumeric input device 312 (e.g., a keyboard), and a user interface (UI) navigation device 314 (e.g., a mouse). In an example, the display unit 310, input device 312 and UI navigation device 614 can be a touch screen display. The machine 300 can additionally include a storage device (e.g., drive unit) 316, a signal generation device 318 (e.g., a speaker), a network interface device 320, and one or more sensors 321, such as a global positioning system (GPS) sensor, compass, accelerometer, or other sensor. The machine 300 can include an output controller 328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 316 can include a machine readable medium 322 on which is stored one or more sets of data structures or instructions 324 (e.g., software) embodying or utilized by any one or more of the process or functions described herein. The instructions 324 can also reside, completely or at least partially, within the main memory 304, within static memory 306, or within the hardware processor 302 during execution thereof by the machine 300. In an example, one or any combination of the hardware processor 602, the main memory 304, the static memory 306, or the storage device 316 can constitute machine readable media.

While the machine readable medium 322 is illustrated as a single medium, the term "machine readable medium" can include a single medium or multiple media (e.g., a centralized or distributed database, and/or associated caches and servers) configured to store the one or more instructions 324.

The term "machine readable medium" can include any medium that is capable of storing, encoding, or carrying instructions for execution by the machine 300 and that cause the machine 300 to perform any one or more of the processes of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine readable medium with a plurality of particles having resting mass. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

Examples and Notes

The present subject matter can be described by way of several examples.

Example 1 can include or use subject matter (such as an apparatus, a method, a means for performing operations, or a machine readable memory including instructions that, when performed by the machine, can configure the machine to perform acts), such as can include or use a web proxy server to receive, from a client, a request to download content from an internet, produce a request to the internet for the content, receive the content from the internet, and produce a malware analysis request in response to receiving the requested content, a malware server communicatively connected to the web proxy server, the malware server to receive the malware analysis request and the content from the web proxy server, and issue a response to the malware analysis request indicating whether to allow the content to be downloaded to the client or prohibit the content from being downloaded to the client, and wherein the web proxy server is to receive the response to the malware analysis request from the malware server and forward the content to the client if the response issued from the malware server indicates the content is allowed and forward a communication to the client that includes an indication that the content is prohibited if the response issued from the malware server indicates the content is to be prohibited from being downloaded to the client.

Example 2 can include or use, or can optionally be combined with the subject matter of Example 1, to include or use, wherein the malware server is to always issue a response to the malware analysis request that indicates the web proxy server is to allow the content to be downloaded to the client.

Example 3 can include or use, or can optionally be combined with the subject matter of at least one of Examples 1-2, to include or use, wherein the malware server is to perform a heuristic analysis on the content prior to issuing the response to the malware analysis request, the response to the malware analysis request indicates the web server is to forward the content to the client in response to the malware server determining the content does not include malware based on the heuristic analysis, and the response to the malware analysis request indicates the web proxy server is to forward a communication to the client that indicates the content is prohibited in response to the malware server determining the content includes malware based on the heuristic analysis.

Example 4 can include or use, or can optionally be combined with the subject matter of at least one of Examples 1-3, to include or use, wherein the malware server is to perform a signature analysis on the content prior to issuing the response to the malware analysis request, the response to the malware analysis request indicates the web server is to forward the content to the client in response to the malware server determining the content does not include malware based on the signature analysis, and the response to the malware analysis request indicates the web proxy server is to forward a communication to the client that indicates the content is prohibited in response to the malware server determining the content includes malware based on the signature analysis.

Example 5 can include or use, or can optionally be combined with the subject matter of at least one of Examples 1-4, to include or use, wherein the malware server is to perform a hash analysis on the content prior to issuing the response to the malware analysis request, the response to the malware analysis request indicates the web server is to forward the content to the client in response to the malware server determining the content does not include malware based on the hash analysis, and the response to the malware analysis request indicates the web proxy server is to forward a communication to the client that indicates the content is prohibited in response to the malware server determining the content includes malware based on the hash analysis.

Example 6 can include or use, or can optionally be combined with the subject matter of at least one of Examples 1-2, to include or use, wherein the malware server is to perform heuristic and signature analyses on the content prior to issuing the response to the malware analysis request, the response to the malware analysis request indicates the web server is to forward the content to the client in response to the malware server determining the content does not include malware based on the heuristic and signature analyses, and the response to the malware analysis request indicates the web proxy server is to forward a communication to the client that indicates the content is prohibited in response to the malware server determining the content includes malware based on the heuristic and signature analyses.

Example 7 can include or use, or can optionally be combined with the subject matter of at least one of Examples 1-6, to include or use a malware analysis module to receive the content from the malware server and perform a malware analysis on the content including at least one of a behavioral, hash, heuristic, or signature analysis and if the malware analysis module determines the content includes malware, the malware analysis module, is to issue a notice to an application that causes the application to remove the content from the client.

Example 8 can include or use, or can optionally be combined with the subject matter of at least one of Examples 1-6, to include or use a malware analysis module to receive the content from the malware server and perform a malware analysis on the content including at least one of a behavioral, hash, heuristic, or signature analysis and if the malware analysis module determines the content includes malware, the malware analysis module is to issue a response to the malware server indicating whether the content is or is not malware, wherein the malware server is to issue a response to the web proxy server based on the response from the malware analysis module, and the web proxy server is to forward the content to the client or forward an indication to the client indicating that the content is prohibited in response to receiving the issued response from the malware server.

Example 9 can include or use subject matter (such as an apparatus, a method, a means for performing operations, or a machine readable memory including instructions that, when performed by the machine, can configure the machine to perform acts), such as can include or use receiving, from a client and at a web proxy server, a request to download content from an internet, producing, at the web proxy server, a request to the internet for the content, receiving, at the web proxy server, the content from the internet, producing, at the web proxy server, a malware analysis request including the received content in response to receiving the content, receiving the malware analysis request including the received content at a malware server, issuing, at the malware server, a response to the malware analysis request indicating whether to allow the content to be downloaded to the client, receiving, at the web proxy server, the issued response from the malware server, and forwarding, from the web proxy server and to the client, the content if the issued response indicates to allow the content to be downloaded and a communication indicating that the content is prohibited if the issued response indicates to prohibit downloading the content to the client.

Example 10 can include or use, or can optionally be combined with the subject matter of Example 9, to include or use, wherein issuing, at the malware server, a response to the malware analysis request indicating whether to allow the content to be downloaded to the client includes always issuing, at the malware server, a response that indicates the content is allowed to be downloaded to the client.

Example 11 can include or use, or can optionally be combined with the subject matter of at least one of Examples 9-10, to include or use receiving, at a malware analysis module, the content from the malware server, performing, at the malware analysis module, a behavioral, hash, heuristic, or signature analysis, in response to determining the content includes malware, issuing, using the malware analysis module a notice to an application that causes the application to remove the content from the client.

Example 12 can include or use, or can optionally be combined with the subject matter of at least one of Examples 9-11, to include or use prior to issuing the response to the malware request, performing, at the malware server, a heuristic analysis on the content prior to issuing the response to the malware analysis request, and wherein the response to the malware analysis request indicates the web proxy server is to forward the content to the client in response to determining the content does not include malware based on the heuristic analysis, and wherein the response to the malware analysis request indicates the web proxy server is to forward a communication to the client indicating the content is prohibited in response to determining the content includes malware based on the heuristic analysis.

Example 13 can include or use, or can optionally be combined with the subject matter of at least one of Examples 9-12, to include or use prior to issuing the response to the malware request, performing, at the malware server, a signature analysis on the content prior to issuing the response to the malware analysis request, and wherein the response to the malware analysis request indicates the web proxy server is to forward the content to the client in response to determining the content does not include malware based on the signature analysis, and wherein the response to the malware analysis request indicates the web proxy server is to forward a communication to the client indicating the content is prohibited in response to determining the content includes malware based on the signature analysis.

Example 14 can include or use, or can optionally be combined with the subject matter of at least one of Examples 9-13, to include or use prior to issuing the response to the malware request, performing, at the malware server, a hash analysis on the content prior to issuing the response to the malware analysis request, and wherein the response to the malware analysis request indicates the web proxy server is to forward the content to the client in response to determining the content does not include malware based on the hash analysis, and wherein the response to the malware analysis request indicates the web proxy server is to forward a communication to the client indicating the content is prohibited in response to determining the content includes malware based on the hash analysis.

Example 15 can include or use, or can optionally be combined with the subject matter of at least one of Examples 9-10, to include or use prior to issuing the response to the malware request, performing, at the malware server, heuristic and signature analyses on the content prior to issuing the response to the malware analysis request, and wherein the response to the malware analysis request indicates the web proxy server is to forward the content to the client in response to determining the content does not include malware based on the heuristic and signature analyses, and wherein the response to the malware analysis request indicates the web proxy server is to forward a communication to the client indicating the content is prohibited in response to determining the content includes malware based on the heuristic and signature analyses.

Example 16 can include or use subject matter (such as an apparatus, a method, a means for performing operations, or a machine readable memory including instructions that, when performed by the machine, can configure the machine to perform acts), such as can include or use instructions, which when executed by a machine, configure the machine to receive, from a web proxy server, a malware analysis request and content, the content downloaded from an internet, and issue a response to the malware request indicating whether to allow the content to be downloaded to the client wherein the response causes the web proxy server to allow the content to be downloaded to the client if the issued response indicates to allow the content to be downloaded to the client and produce a communication indicating that the content is prohibited if the issued response indicates to prohibit downloading the content to the client.

Example 17 can include or use, or can optionally be combined with the subject matter of Example 16, to include or use, wherein the instructions for issuing the response include instructions, which when executed by the machine, configure the machine to always issue a response that indicates the content is allowed to be downloaded to the client in response to receiving the malware analysis request.

Example 18 can include or use, or can optionally be combined with the subject matter of at least one of Examples 16-17, to include or use instructions, which when executed by the machine, configure the machine to, prior to issuing the response to the malware analysis request, perform a heuristic analysis on the content prior to issuing the response to the malware analysis request, wherein the instructions for issuing the response to the malware analysis request include instructions, which when executed by the machine, configure the machine to indicate the web proxy server is to forward the content to the client in response to determining the content does not include malware based on the heuristic analysis, and wherein the instructions for issuing the response to the malware analysis request include instructions, which when executed by the machine, configure the machine to issue a response indicating the web proxy server is to forward a communication to the client that indicates the content is prohibited in response to determining the content includes malware based on the heuristic analysis.

Example 19 can include or use, or can optionally be combined with the subject matter of at least one of Examples 16-18, to include or use instructions, which when executed by the machine, configure the machine to, prior to issuing the response to the malware request, perform a signature analysis on the content prior to issuing the response to the malware analysis request, wherein the instructions for issuing the response to the malware analysis request include instructions, which when executed by the machine, configure the machine to indicate the web proxy server is to forward the content to the client in response to determining the content does not include malware based on the signature analysis, and wherein the instructions for issuing the response to the malware analysis request include instructions, which when executed by the machine, configure the machine to issue a response indicating the web proxy server is to forward a communication to the client that indicates the content is prohibited in response to determining the content includes malware based on the signature analysis.

Example 20 can include or use, or can optionally be combined with the subject matter of at least one of Examples 16-19, to include or use instructions, which when executed by the machine, configure the machine to, prior to issuing the response to the malware request, perform heuristic and signature analyses on the content prior to issuing the response to the malware analysis request, wherein the instructions for issuing the response to the malware analysis request include instructions, which when executed by the machine, configure the machine to indicate the web proxy server is to forward the content to the client in response to determining the content does not include malware based on the heuristic and signature analyses, and wherein the instructions for issuing the response to the malware analysis request include instructions, which when executed by the machine, configure the machine to issue a response indicating the web proxy server is to forward a communication to the client that indicates the content is prohibited in response to determining the content includes malware based on the heuristic and signature analyses.

The above Description of Embodiments includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The functions or processes described herein can be implemented in software, hardware, human implemented procedures, or a combination thereof. The software can consist of computer executable instructions stored on computer readable media such as memory or other type of storage devices. The term "computer readable media" is also used to represent any means by which the computer readable instructions can be received by the computer, such as by different forms of wired or wireless transmissions. Further, such functions correspond to modules, which are software, hardware, firmware or any combination thereof. Multiple functions can be performed in one or more modules as desired, and the embodiments described are merely examples. The software can be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Description of Embodiments, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Description of Embodiments as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method comprising:
producing, at a web proxy server situated between a client and an internet, a request to the internet for content requested by the client;
producing, at the web proxy server, a malware analysis request including the requested content in response to receiving the content;
receiving the malware analysis request including the received content at a malware server;
issuing, at the malware server, a response to the malware analysis request indicating whether to allow the content to be downloaded to the client, wherein the response always indicates the content is allowed to be downloaded to the client; and
forwarding, from the web proxy server and to the client, the content in response to the issued response indicating to allow the content to be downloaded and a communication indicating that the content is prohibited in response to the issued response indicating to prohibit downloading the content to the client.

2. The method of claim 1, further comprising:
receiving, at a malware analysis module, the content from the malware server;
performing, at the malware analysis module, a behavioral, hash, heuristic, or signature analysis; and
in response to determining the content includes malware, issuing, using the malware analysis module a notice to an application that causes the application to remove the content from the client.

3. The method of claim 1, further comprising:
after issuing the response to the malware request, performing, at the malware server, a heuristic analysis on the content and in response to determining the content includes malware based on the heuristic analysis, issuing, using the malware analysis module a notice to an application that causes the application to remove the content from the client.

4. The method of claim 1, further comprising:
after issuing the response to the malware request, performing, at the malware server, a signature analysis on the content and in response to determining the content includes malware based on the signature analysis, issuing, using the malware analysis module a notice to an application that causes the application to remove the content from the client.

5. The method of claim 1, further comprising:
after issuing the response to the malware request, performing, at the malware server, a hash analysis on the content and in response to determining the content includes malware based on the hash analysis, issuing, using the malware analysis module a notice to an application that causes the application to remove the content from the client.

6. The method of claim 1, further comprising:
after issuing the response to the malware request, performing, at the malware server, heuristic and signature analyses on the content and in response to determining the content includes malware based on at least one of the heuristic and signature analyses, issuing, using the malware analysis module a notice to an application that causes the application to remove the content from the client.

7. A system comprising:

a web proxy server to receive, from a client, a request to download content from an internet, produce a request to the internet for the content, receive the content from the internet, and produce a malware analysis request in response to receiving the requested content;

a malware server to receive the malware analysis request and the content from the web proxy server, and issue a response to the malware analysis request indicating whether to allow the content to be downloaded to the client or prohibit the content from being downloaded to the client; and wherein the web proxy server is to receive the response to the malware analysis request and forward the content to the client in response to the response issued from the malware server indicating the content is allowed and forward a communication to the client that includes an indication that the content is prohibited in response to the response issued from the malware server indicating the content is to be prohibited from being downloaded to the client, wherein the malware server is to always issue a response to the malware analysis request that indicates the web proxy server is to allow the content to be downloaded to the client.

8. The system of claim 7, wherein:

the malware server is to perform a heuristic analysis on the content prior to issuing the response to the malware analysis request, the response to the malware analysis request indicates the web server is to forward the content to the client in response to the malware server determining the content does not include malware based on the heuristic analysis, and the response to the malware analysis request indicates the web proxy server is to forward a communication to the client that indicates the content is prohibited in response to the malware server determining the content includes malware based on the heuristic analysis.

9. The system of claim 7, wherein:

the malware server is to perform a signature analysis on the content prior to issuing the response to the malware analysis request, the response to the malware analysis request indicates the web server is to forward the content to the client in response to the malware server determining the content does not include malware based on the signature analysis, and the response to the malware analysis request indicates the web proxy server is to forward a communication to the client that indicates the content is prohibited in response to the malware server determining the content includes malware based on the signature analysis.

10. The system of claim 7, wherein:

the malware server is to perform a hash analysis on the content prior to issuing the response to the malware analysis request, the response to the malware analysis request indicates the web server is to forward the content to the client in response to the malware server determining the content does not include malware based on the hash analysis, and the response to the malware analysis request indicates the web proxy server is to forward a communication to the client that indicates the content is prohibited in response to the malware server determining the content includes malware based on the hash analysis.

11. The system of claim 7, wherein:

the malware server is to perform heuristic and signature analyses on the content prior to issuing the response to the malware analysis request, the response to the malware analysis request indicates the web server is to forward the content to the client in response to the malware server determining the content does not include malware based on the heuristic and signature analyses, and the response to the malware analysis request indicates the web proxy server is to forward a communication to the client that indicates the content is prohibited in response to the malware server determining the content includes malware based on the heuristic and signature analyses.

12. The system of claim 7, further comprising:

a malware analysis module to receive the content from the malware server and perform a malware analysis on the content including at least one of a behavioral, hash, heuristic, or signature analysis and in response to the malware analysis module determining the content includes malware, the malware analysis module, is to issue a notice to an application that causes the application to remove the content from the client.

13. The system of claim 7, further comprising:

an malware analysis module to receive the content from the malware server and perform a malware analysis on the content including at least one of a behavioral, hash, heuristic, or signature analysis and in response to the malware analysis module determining the content includes malware, the malware analysis module is to issue a response to the malware server indicating whether the content is or is not malware, wherein the malware server is to issue a response to the web proxy server based on the response from the malware analysis module, and the web proxy server is to forward the content to the client or forward an indication to the client indicating that the content is prohibited in response to receiving the issued response from the malware server.

14. A malware server including one or more Processors and a computer readable storage device including instructions stored thereon, which when executed by the one or more processors of the malware server, configure the malware server to:

receive, from a web proxy server situated between a client and an internet, a malware analysis request and content, the content downloaded from the internet; and issue a response to the malware request indicating whether the content is to be allowed or prohibited including always issuing a response to the malware request indicating the content is allowed to be downloaded to the client, wherein the web proxy server is to receive the response to the malware analysis request and forward the content to the client in response to the response issued from the malware server indicating the content is allowed and forward a communication to the client that includes an indication that the content is prohibited in response to the response issued from the malware server indicating the content is to be prohibited from being downloaded to the client.

15. The malware server of claim 14, further comprising instructions, which when executed by the machine, configure the malware server to:

after issuing the response to the malware analysis request, perform a heuristic analysis on the content and in response to determining the content includes malware based on the heuristic analysis, issuing a notice to an application that causes the application to remove the content from the client.

16. The malware server of claim 14, further comprising instructions, which when executed by the malware server, configure the malware server to:

after issuing the response to the malware request, perform a signature analysis on the content and in response to determining the content includes malware based on the signature analysis, issuing a notice to an application that causes the application to remove the content from the client.

17. The malware server of claim 14, further comprising instructions, which when executed by the malware server, configure the malware server to:

after issuing the response to the malware request, perform heuristic and signature analyses on the content and in response to determining the content includes malware based on at least one of the heuristic and the signature analyses, issuing a notice to an application that causes the application to remove the content from the client.

\* \* \* \* \*